US006999640B1

(12) United States Patent
Harris (10) Patent No.: US 6,999,640 B1
(45) Date of Patent: Feb. 14, 2006

(54) MID-LINK PMD COMPENSATION AND CHANNEL EQUALIZATION IN AN OPTICAL COMMUNICATION NETWORK

(75) Inventor: David Lindel Harris, Pleasanton, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 10/958,032

(22) Filed: Oct. 4, 2004

(51) Int. Cl.
  G02B 6/00 (2006.01)
  G02B 6/28 (2006.01)
(52) U.S. Cl. ....................... 385/11; 398/147
(58) Field of Classification Search ............ 385/14–16, 385/24; 359/110, 124, 349, 337.1; 398/183, 398/147
  See application file for complete search history.

(56) References Cited

U.S. PATENT DOCUMENTS

| 2003/0090755 | A1 * | 5/2003 | Chung et al. ............... 359/110 |
| 2005/0002675 | A1 * | 1/2005 | Sardesai et al. ............ 398/183 |
| 2005/0111848 | A1 * | 5/2005 | Grubb et al. ............... 398/147 |

OTHER PUBLICATIONS

Doerr, C. R., et al., "Dynamic Wavelength Equalizer in Silica Using the Single-Filtered-Arm Interferometer," IEEE Photonics Technology Letters, vol. 11, No. 5, May 1999, pp. 581-583.

Ford, Joseph, E., and Walker, James A., "Dynamic Spectral Power Equalization Using Micro-Opto-Mechanics," IEEE Photonics Technology Letters, vol. 10, No. 10 Oct. 1998, pp. 1440-1442.

Kim, Hyo Sang, et al., "Actively Gain-Flattened Erbium-Doped Fiber Ampli er Over 35 nm by Using All-Fiber Acoustooptic Tunable Filters," IEEE Photonics Technology Letters, vol. 10, No. 6, Jun. 1998, pp. 790-792.

* cited by examiner

Primary Examiner—Akm Enayet Ullah (57) ABSTRACT

Systems and methods are described that compensate for polarization-mode dispersion (PMD) mid-link in a network. According to the invention, a light conditioning system is installed mid-link in a network and receives a channel from a de-multiplexer. In the light conditioning system, a splitter system receives a light beam representing the channel from the de-multiplexer. The splitter system splits the input light beam into a first beam having a first polarization mode and a second beam having a second polarization mode substantially orthogonal to the first polarization mode. A PMD system then synchronizes the first polarization mode and the second polarization mode in time to compensate for PMD affecting the input light beam. A combiner system combines the first beam and the second beam into an output light beam that is PMD compensated, and transmits the output light beam to a multiplexer.

27 Claims, 6 Drawing Sheets

MID-LINK PMD COMPENSATION AND CHANNEL EQUALIZATION IN AN OPTICAL COMMUNICATION NETWORK

BACKGROUND OF THE INVENTION

1. Field of the Invention

The invention is related to the field of communications, and in particular, to systems and methods of compensating for polarization-mode dispersion (PMD) mid-link on an optical communication network. More particularly, the invention is related to systems and methods of compensating for polarization-mode dispersion (PMD) and providing channel equalization simultaneously mid-link on an optical communication network.

2. Description of the Prior Art

Polarization-mode dispersion (PMD) is a dynamic pulse broadening phenomena. In a single-mode optical fiber, optical pulses propagating down the fiber will separate into two orthogonal modes of polarization that travel at different speeds. The relative amplitudes of these two pulses are determined by the state of polarization of the input pulse relative to the fiber's input principal states of polarization (PSP). The separation into the two orthogonal modes is caused by the non-uniformity of the core diameter of the fiber or birefringence of the fiber.

If the core has a perfectly circular cross-section, then both modes travel at the same speed over the same distance. Otherwise, one mode travels slower than the other mode resulting in a difference in group velocities (an effect called birefringence). Like chromatic dispersion, the difference in group velocities between polarization modes is wavelength dependent. For PMD, the difference in group velocity is also time dependent. The difference in propagation time, $\Delta \tau$, experienced by the two polarization modes at a given wavelength is referred to as the differential group delay (DGD) with units in picoseconds (ps). When the DGD in a fiber becomes excessively large, the receiver is unable to distinguish between a zero bit and a one bit, and bit errors eventually occur resulting in a PMD-induced outage.

To compensate for PMD, optical PMD compensators are installed in the optical communication network at the receiver end of the network. In a Wavelength Division Multiplexed (WDM) network, PMD compensators are installed at the receiver end between the de-multiplexer (that de-multiplexes the individual channels) and the receiver. There is usually one PMD compensator for each channel. The PMD compensators mitigate the effects of PMD on the individual channels so that the receiver can more accurately decode the optical signals.

Network operators may compensate for PMD mid-link using optical-to-electrical-to-optical (O-E-O) regenerators. However, O-E-O regenerators are expensive and it may not be economically feasible to install O-E-O regenerators wherever there is a need for PMD compensation.

Unfortunately, optical PMD compensators are not currently installed mid-link in a network in an effective manner. One reason why PMD compensators are not currently installed mid-link is that PMD compensators are wavelength dependent and the WDM signals traveling over the network need to be separated or de-multiplexed into individual channels for the PMD compensators. Thus, network operators either need to install a new de-multiplexer to separate the wavelengths for the PMD compensators, or install the PMD compensators at mid-link points in the network where de-multiplexers are already installed.

Installing a new de-multiplexer/multiplexer combination mid-link for the purpose of installing PMD compensators may not be desirable. Installing a new de-multiplexer/ multiplexer combination adds cost to the network. Also, the new de-multiplexer and the new multiplexer may attenuate the optical signals more than desired.

Similarly, installing current PMD compensators at mid-link points in the network where de-multiplexers are already installed may not be desirable. For instance, periodically over long haul and ultra-long haul networks, the gains of the individual wavelengths are equalized with a Dynamic Gain Equalizer (DGE). A DGE comprises a de-multiplexer, channel equalization elements, and a multiplexer. When the DGEs are installed in the network at gain equalization points, the de-multiplexer is installed ahead of the channel equalization elements to separate the WDM signals into individual channels and the multiplexer is installed following the channel equalization elements to combine the channels again. PMD compensators are generally not used in combination with a DGE to compensate for PMD mid-link because of the attenuation added by the PMD compensators. As an example, the combination of the de-multiplexer (~5 dB loss), the channel equalization element (~5 dB loss), the PMD compensator (~10 dB loss), and the multiplexer (~5 dB loss) could reach approximately 25 dB of attenuation which may be undesirable.

A problem still exists to effectively compensate for PMD mid-link in an optical communication network.

SUMMARY OF THE INVENTION

The above and other problems are solved with systems and methods that compensate for PMD mid-link in an optical communication network as opposed to compensation only at the receiver end. In one embodiment of the invention, a light conditioning system is installed mid-link in an optical communication network to compensate for PMD. The light conditioning system is connected to a de-multiplexer installed in the network and receives a channel from the de-multiplexer in the form of a light beam. The light conditioning system includes a splitter system, a PMD system, and a combiner system. The splitter system receives the light beam (referred to herein as the input light beam) from the de-multiplexer. The splitter system splits the input light beam into a first beam having a first polarization mode and a second beam having a second polarization mode. The second polarization mode of the second beam is substantially orthogonal to the first polarization mode of the first beam. The PMD system synchronizes the first polarization mode and the second polarization mode in time to compensate for PMD affecting the input light beam. The combiner system combines the first beam and the second beam into an output light beam that is PMD compensated, and transmits the output light beam to a multiplexer installed in the network.

Advantageously, the light conditioning system allows network operators to compensate for PMD in a light beam mid-link without adding further attenuation to the light beam. Consequently, the network operators are not forced to compensate for PMD mid-link using an O-E-O regenerator, or forced to compensate for PMD only at the receiver end.

In another embodiment, the light conditioning system further includes a polarization system in order to provide PMD compensation and channel equalization simultaneously. The splitter system receives the input light beam from the de-multiplexer and splits the input light beam into a first beam having a first polarization mode and a second beam having a second polarization mode. The second polarization mode of the second beam is substantially orthogonal to the first polarization mode of the first beam. The PMD system synchronizes the first polarization mode and the second polarization mode in time to compensate for PMD affecting the input light beam. The polarization system adjusts the polarization of the first polarization mode and the second polarization mode so that the combiner system attenuates the output light beam a desired amount. The combiner system combines the first beam and the second beam into the output light beam that is PMD compensated equalized, and transmits the output light beam to a multiplexer installed in the network.

The invention may include other embodiments described below.

BRIEF DESCRIPTION OF THE DRAWINGS

The same reference number represents the same element on all drawings.

DETAILED DESCRIPTION OF THE INVENTION

Prior Art—FIGS. 1–5

Figure 1:
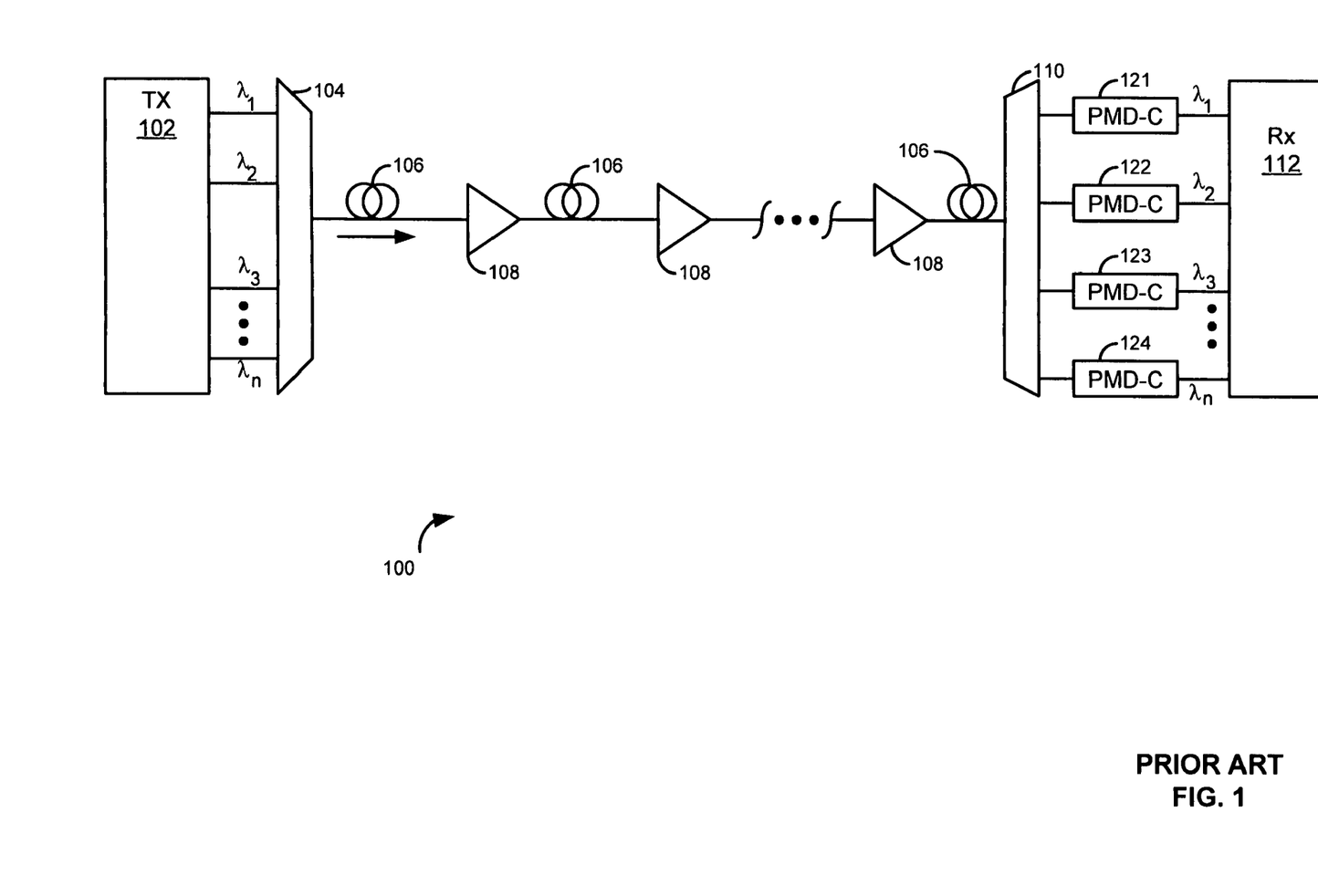
FIG. 1 illustrates a WDM optical communication network in the prior art.

FIG. 1 illustrates a WDM optical communication network 100 in the prior art. When in operation, transmitter (Tx) 102 transmits a plurality of channels ($\lambda_1, \lambda_2, \lambda_3, \ldots, \lambda_n$) to multiplexer 104. Multiplexer 104 multiplexes the channels into WDM signals and transmits the WDM signals over the network link formed by fiber spans 106 and amplifiers 108. There may be more fiber spans 106, amplifiers 108, or other components not shown in FIG. 1. De-multiplexer 110 receives the WDM signals and separates WDM signals into individual channels. De-multiplexer 110 transmits each channel to a Polarization-Mode Dispersion (PMD) compensator 121–124. Each PMD compensator 121–124 mitigates PMD on a channel and transmits the channel to receiver 112.

In network 100, PMD compensators 121–124 are installed between de-multiplexer 110 and receiver 112. PMD compensators 121–124 are installed at this point in network 100 for a number of reasons. First, network operators may want or need to compensate for PMD on the channels before receiver 112 attempts to decode data from the channels. Secondly, the WDM signals are separated into individual channels (i.e., wavelengths) by de-multiplexer 110 at this point in network 100. PMD compensators are wavelength dependent, so network operators take advantage of de-multiplexer 110 separating the WDM signals into individual channels by installing PMD compensators 121–124 on each channel transmitted to receiver 112.

Figure 2:
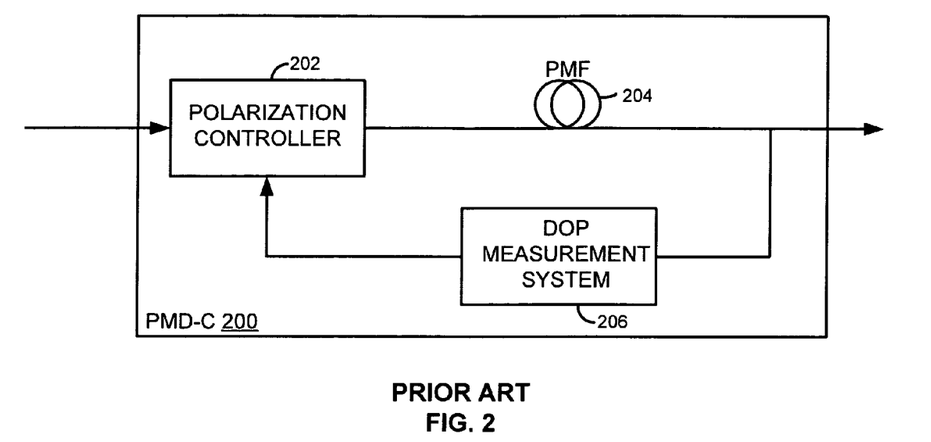
FIG. 2 illustrates a PMD compensator (PMD-C) in the prior art.

FIG. 2 illustrates a PMD compensator (PMD-C) 200 in the prior art. PMD compensator 200 includes a polarization controller 202, a span of Polarization Maintaining Fiber (PMF) 204, and a DOP measurement system 206. The configuration and operation of PMD compensator 200 are known to those skilled in the art.

Figure 3:
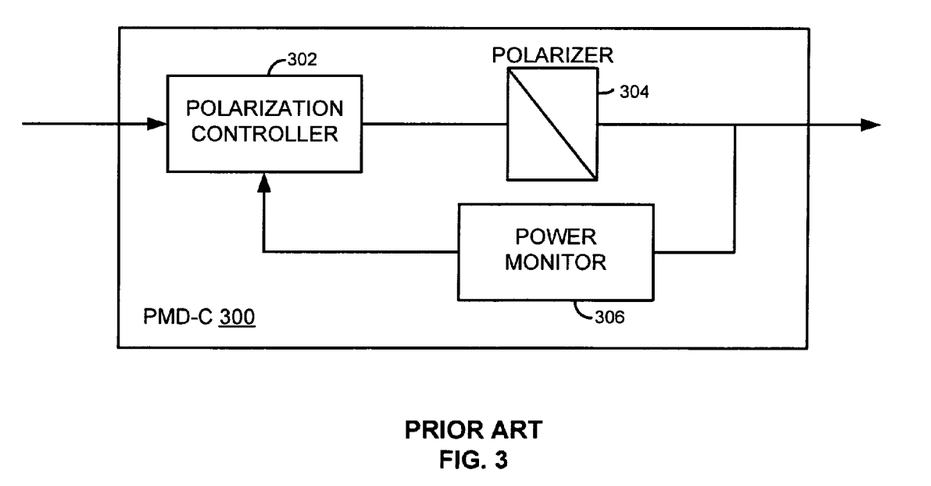
FIG. 3 illustrates another PMD compensator (PMD-C) in the prior art.

FIG. 3 illustrates another PMD compensator (PMD-C) 300 in the prior art. PMD compensator 300 includes a polarization controller 302, a polarizer 304, and a power monitor 306. The configuration and operation of PMD compensator 300 are known to those skilled in the art.

Unfortunately, optical PMD compensators are generally installed at the receiver end of a WDM optical communication network as shown in FIG. 1, and are not effectively installed mid-link in a network. One reason why PMD compensators are not currently installed mid-link is that the WDM signals traveling over the network need to be separated or de-multiplexed into individual channels before the PMD compensators can be installed. Thus, network operators either need to install a new de-multiplexer to separate the wavelengths for the PMD compensators, or install the PMD compensators at mid-link points in the network where de-multiplexers are already installed.

Installing a new de-multiplexer/multiplexer combination mid-link for the purpose of installing PMD compensators may not be desirable. Installing a new de-multiplexer and a new multiplexer add cost to the network. Also, the new de-multiplexer and multiplexer may attenuate the optical signals more than desired.

Similarly, installing PMD compensators at mid-link points in the network where de-multiplexers are already installed may not be desirable. De-multiplexers may be already installed mid-link for a variety of reasons. As one example, de-multiplexers are installed at Optical Add/Drop Multiplexers (O-ADM) in the network. As another example, de-multiplexers are installed in DGEs in the network.

Figure 4:
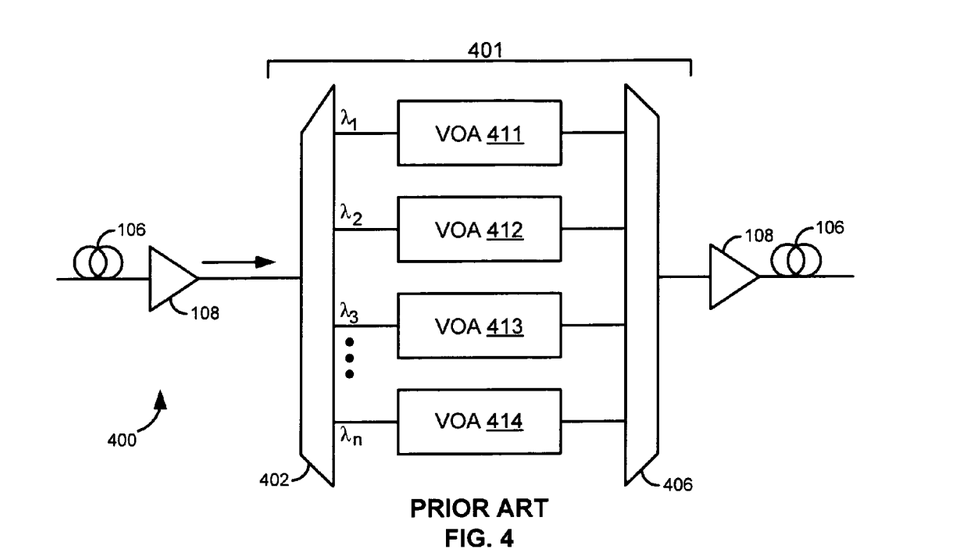
FIG. 4 illustrates a mid-link section of the network in FIG. 1 where a Dynamic Gain Equalizer (DGE) is installed in the prior art.

FIG. 4 illustrates a mid-link section 400 of network 100 where DGE 401 is installed in the prior art. In FIG. 4, DGE 401 comprises a de-multiplexer 402, Variable Optical Attenuators (VOA) 411–414, and multiplexer 406 are installed between two amplifiers 108 mid-link in network 100. De-multiplexer 402 receives WDM signals and separates the WDM signals into individual channels ($\lambda_1, \lambda_2, \lambda_3, \ldots, \lambda_n$). De-multiplexer 110 transmits a channel to each of VOAs 411–414. VOAs 411–414 may attenuate the channel that they receive in order to equalize the power of the channels. VOAs 411–414 then transmit the channels to multiplexer 406 to be recombined.

Figure 5:
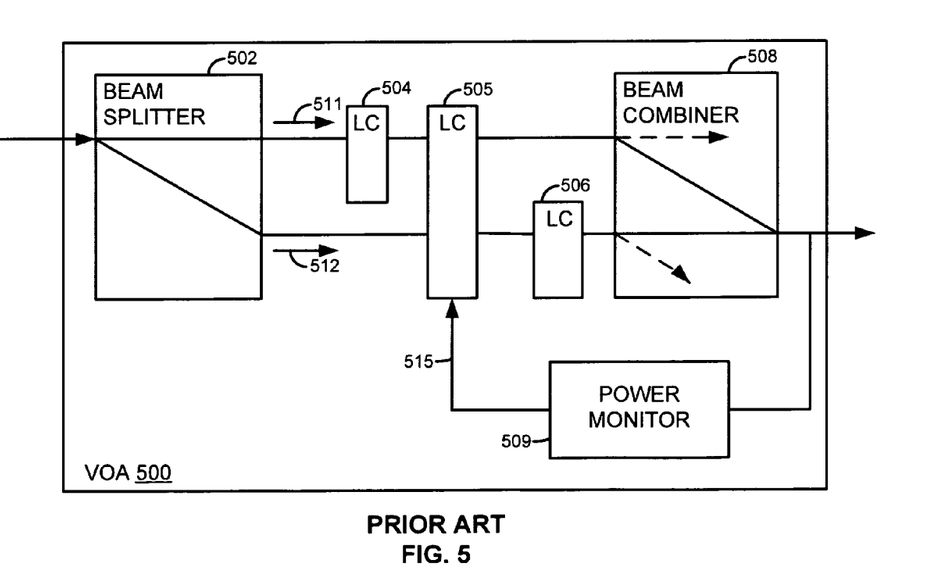
FIG. 5 illustrates a Variable Optical Attenuator (VOA) in the prior art.

FIG. 5 illustrates a VOA 500 in the prior art. VOA 500 in FIG. 5 is shown as a liquid crystal (LC) variable optical attenuator, but could take on other configurations. VOA 500 includes a beam splitter 502, a liquid crystal half wave plate 504, a liquid crystal wave plate 505, a liquid crystal half wave plate 506, a beam combiner 508, and a power monitor 509. When in operation, beam splitter 502 receives an input light beam and splits the beam into a first beam 511 having a first polarization mode and a second beam 512 having a second polarization mode. The first polarization mode is orthogonal to the second polarization mode. Half wave plate 504 then receives the first beam 511 and adjusts the first polarization mode of the first beam 511 to be parallel to the second polarization mode of the second beam 512. Wave plate 505 receives the first beam 511 and the second beam 512, receive a control voltage 515 from power monitor 509, and adjusts the polarization of the first beam 511 and the second beam 512 based on the control voltage 515. Half wave plate 506 then receives the second beam 512 and adjusts the second polarization mode of the second beam 512 to again be orthogonal to the first polarization mode of the first beam 511. Beam combiner 508 then combines the first beam 511 and the second beam 512 into an output light beam. Based on the polarization adjustment by wave plate 505, output light beam may be attenuated compared to the input light beam.

Even though a de-multiplexer is installed ahead of the VOAs to separate the WDM signals into individual channels, PMD compensators are generally not used in combination with VOAs to compensate for PMD mid-link because of the attenuation added by the PMD compensators. As an example, the combination of the de-multiplexer (~5 dB loss), the VOA (~5 dB loss), the PMD compensator (~10 dB loss), and the multiplexer (~5 dB loss) could reach approximately 25 dB of attenuation. This amount of attenuation may be undesirable.

Figure 6:
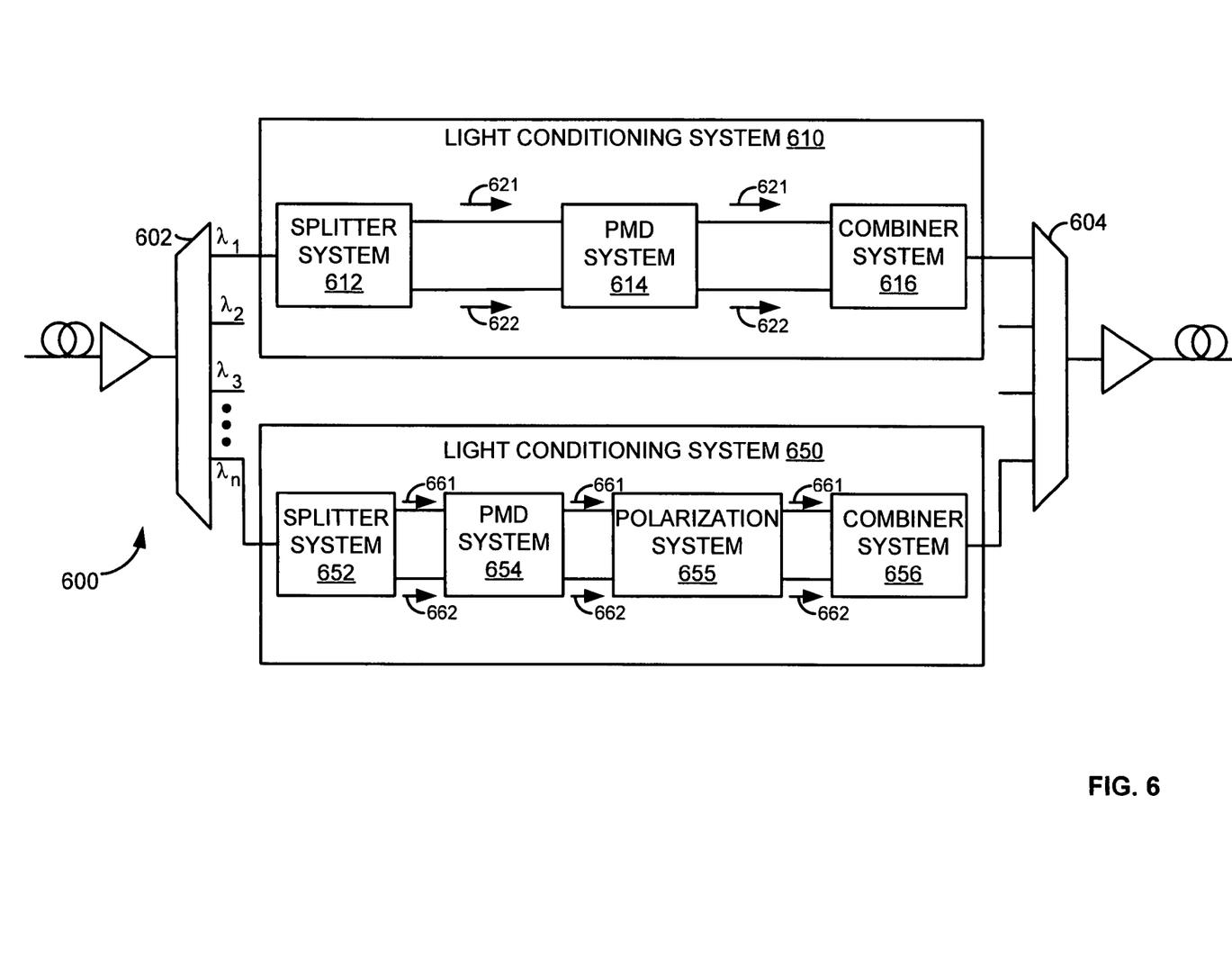
FIG. 6 illustrates a mid-link section of a WDM optical communication network in an exemplary embodiment of the invention.
Figure 7:
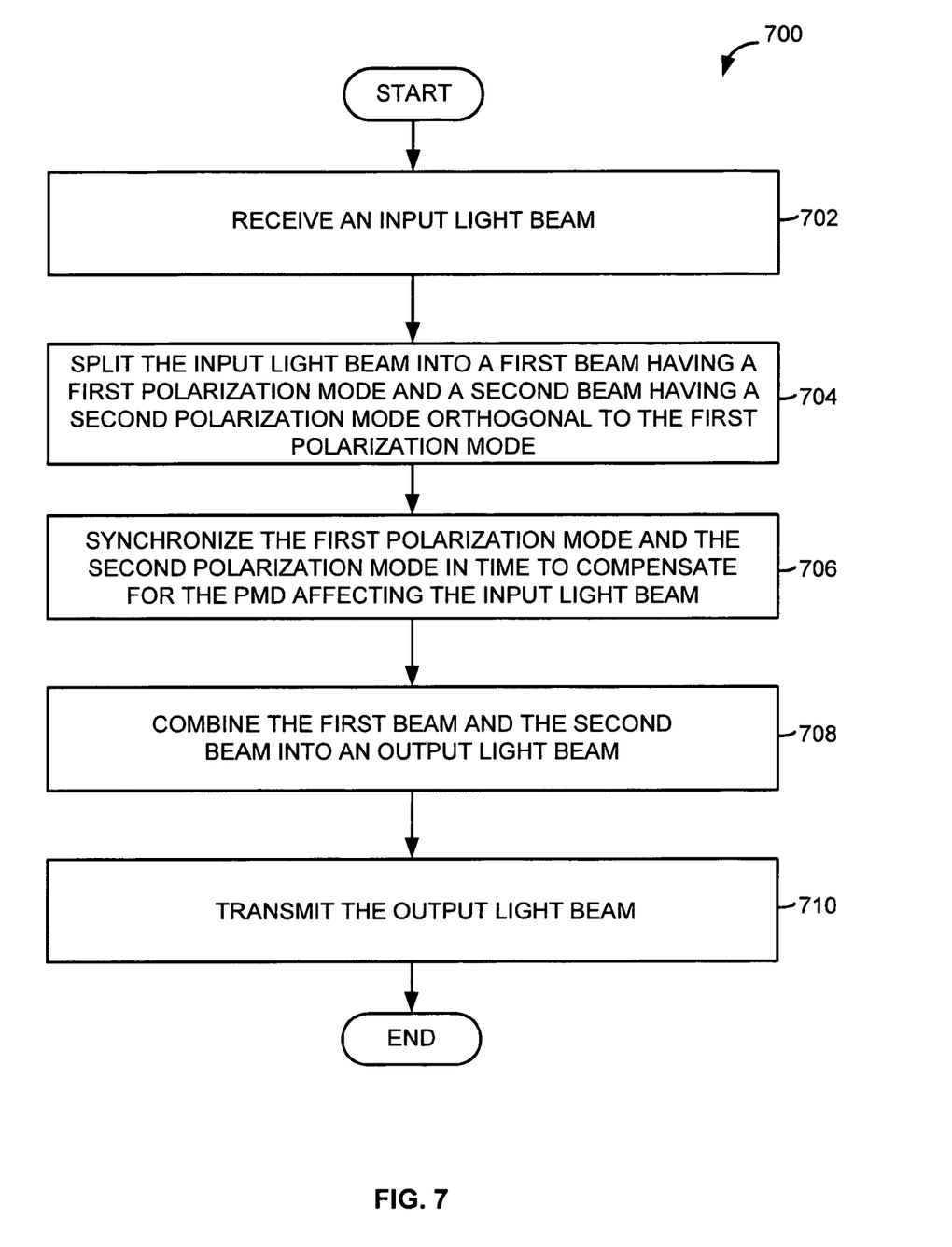
FIG. 7 is a flow chart illustrating a method of compensating for PMD in an exemplary embodiment of the invention.
Figure 8:
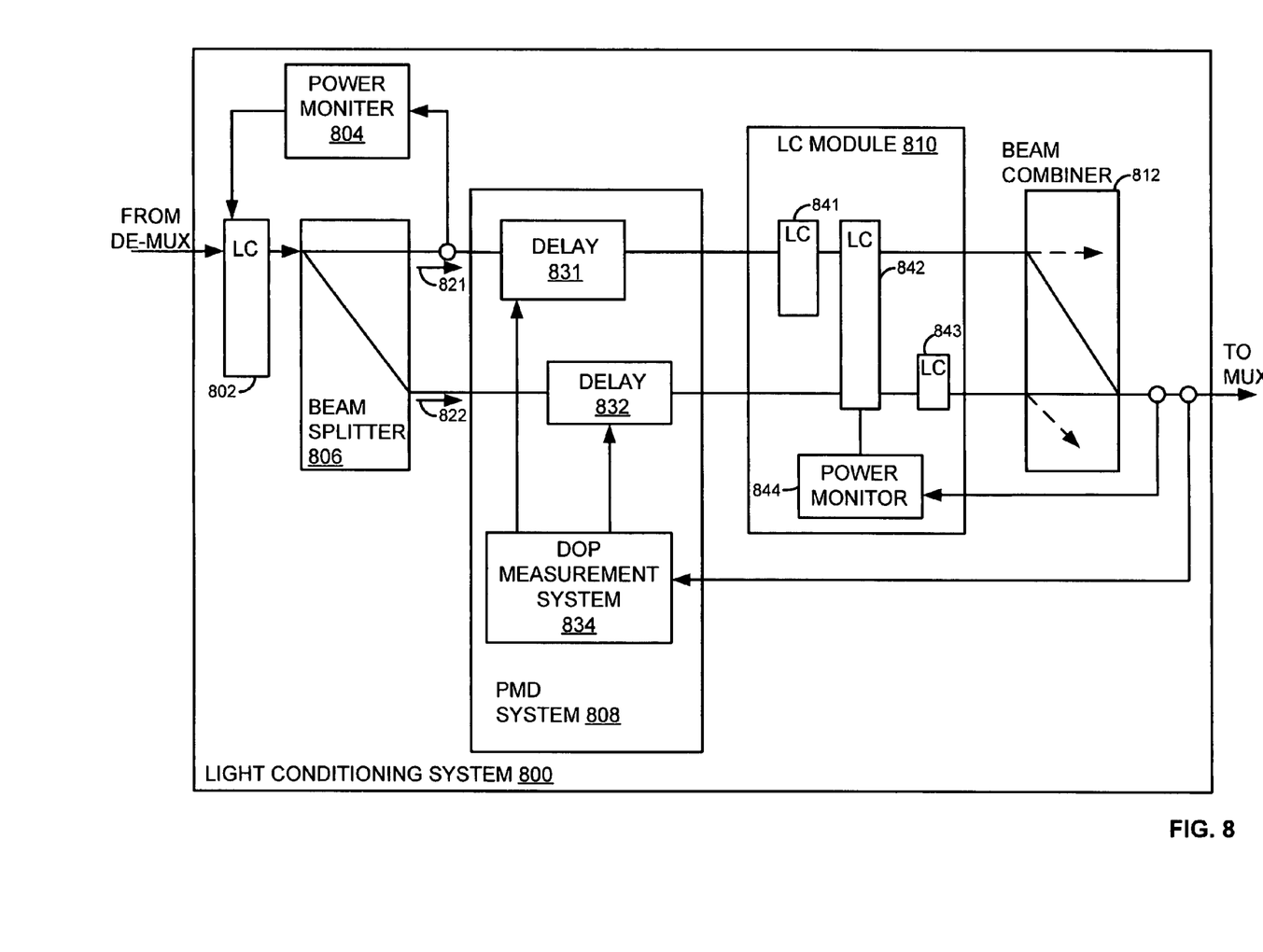
FIG. 8 illustrates a light conditioning system in an exemplary embodiment of the invention.

Description of the Invention—FIGS. 6–8

FIGS. 6–8 and the following description depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

FIG. 6 illustrates a mid-link section 600 of a WDM optical communication network in an exemplary embodiment of the invention. Section 600 of the WDM optical communication network includes a de-multiplexer 602, and light conditioning system 610, and a multiplexer 604. Light conditioning system 610 is connected between de-multiplexer 602 and multiplexer 604. Light conditioning system 610 includes a splitter system 612, a Polarization-Mode Dispersion (PMD) system 614, and a combiner system 616. De-multiplexer 602, multiplexer 604, and light conditioning system 610 are installed mid-link in the WDM optical communication network, as opposed to the receiver end of the network. Mid-link in this embodiment may be considered a section in the network between the transmitter end and the receiver end. Section 600 may include other components, devices, or systems not shown in FIG. 6. For instance, section 600 may include a light conditioning system for each channel of the WDM optical communication network.

When in operation, section 600 carries WDM signals that have been traveling over the network link. In traveling over the link, the WDM signals may be affected by PMD. De-multiplexer 602 receives WDM signals and separates the WDM signals into individual channels ($\lambda_1, \lambda_2, \lambda_3, \ldots, \lambda_n$). Each channel may have a bit rate of 10 Gb/s, 40 Gb/s, or higher. The individual channels comprise light beams that are affected by PMD. De-multiplexer 602 transmits a light beam representing a channel ($\lambda_1$) to light conditioning system 610.

FIG. 7 is a flow chart illustrating a method 700 of compensating for PMD in the light beam using light conditioning system 610 in an exemplary embodiment of the invention. In step 702, splitter system 612 receives the light beam (referred to herein as the input light beam) from de-multiplexer 602. In step 704, splitter system 612 splits the input light beam into a first beam 621 having a first polarization mode and a second beam 622 having a second polarization mode. The second polarization mode of the second beam 622 is substantially orthogonal to the first polarization mode of the first beam 621. Splitter system 612 may comprise a polarizing beam splitter or any other system that operates according to step 704.

PMD system 614 receives the first beam 621 and the second beam 622 from splitter system 612. In step 706, PMD system 614 synchronizes the first polarization mode of the first beam 621 and the second polarization mode of the second beam 622 in time to compensate for PMD affecting the input light beam. Synchronizing in this embodiment means substantially synchronizing the two polarization modes within an acceptable tolerance. PMD system 614 may use any desired technique to synchronize the first polarization mode and the second polarization mode. For instance, PMD system 614 may delay one or both of the first polarization mode and the second polarization mode to synchronize the modes.

Combiner system 616 then receives the first beam 621 and the second beam 622 from PMD system 614. In step 708, combiner system 616 combines the first beam 621 and the second beam 622 into an output light beam. Combiner system 616 may comprise a polarizing beam combiner or any other system that operates according to step 708. Any PMD that was affecting the input light beam should be substantially compensated for in the output light beam. In step 710, combiner system 616 transmits the output light beam to multiplexer 604.

In some embodiments, the light conditioning system may simultaneously compensate for PMD while also providing gain equalization. FIG. 6 further illustrates light conditioning system 650 connected between de-multiplexer 602 and multiplexer 604 in another embodiment of the invention. Light conditioning system 650 includes a splitter system 652, a PMD system 654, a polarization system 655, and a combiner system 656. When in operation, splitter system 652 receives a light beam (referred to herein as the input light beam) from de-multiplexer 602. Splitter system 652 splits the input light beam into a first beam 661 having a first polarization mode and a second beam 662 having a second polarization mode. The second polarization mode of the second beam 662 is substantially orthogonal to the first polarization mode of the first beam 661. PMD system 654 receives the first beam 661 and the second beam 662 from splitter system 652. PMD system 654 synchronizes the first polarization mode of the first beam 661 and the second polarization mode of the second beam 662 in time to compensate for PMD affecting the input light beam. Synchronizing in this embodiment means substantially synchronizing the two polarization modes within an acceptable tolerance. Polarization system 655 then receives the first beam 661 and the second beam 662 from PMD system 654. Polarization system 655 adjusts the polarization of the first polarization mode and the second polarization mode so that combiner system 655 attenuates the output light beam a desired amount. Combiner system 656 then receives the first beam 661 and the second beam 662, and combines the first beam 661 and the second beam 662 into the output light beam. Light conditioning system 650 simultaneously compensates for PMD and equalizes the gain of the light beam.

FIG. 8 illustrates a light conditioning system 800 in another exemplary embodiment of the invention. Due to the configuration of light conditioning system 800, it may be referred to as a Variable Optical Attenuator (VOA) with PMD compensation or a liquid crystal VOA with PMD compensation. Light conditioning system 800 includes a liquid crystal wave plate 802, a power monitor 804, a polarizing beam splitter 806, a PMD system 808, a liquid crystal (LC) module 810, and a polarizing beam combiner 812. PMD system 808 includes delays 831–832 and Degree of Polarization (DOP) measurement system 834. Liquid crystal module 810 includes a liquid crystal half wave plate 841, a liquid crystal wave plate 842, a liquid crystal half wave plate 843, and a power monitor 844. Light conditioning system 800 may include other components, devices, or systems not shown in FIG. 8.

Light conditioning system 800 is installed mid-link in a WDM optical communication network. For instance, light conditioning system 800 may be installed at a gain equalization point in the network. A gain equalization point represents any point in a network where network operators determine a need for gain equalization over the WDM channels. Assume for this embodiment that light conditioning system 800 is connected between a de-multiplexer (not shown) and a multiplexer (not shown) that are also installed mid-link. The de-multiplexer and the multiplexer may be already installed in the network, such as for gain equalization or in an O-ADM.

When in operation, the de-multiplexer transmits a light beam representing a channel to light conditioning system 800. Wave plate 802 receives the input light beam. The combination of wave plate 802 and power monitor 804 operate to optimize the polarization of the input light beam received by beam splitter 806. Power monitor 804 receives a feedback light beam resulting from beam splitter 806 and generates a control voltage based on the feedback light beam. Power monitor 804 applies the control voltage to the wave plate 802 to optimize the polarization.

The input light beam then travels to beam splitter 806. Beam splitter 806 splits the input light beam into a first beam 821 having a first polarization mode and a second beam 822 having a second polarization mode. The second polarization mode is substantially orthogonal to the first polarization mode. The combination of wave plate 802 and power monitor 804 should have adjusted the polarization of the input light beam so that the first beam 821 and the second beam 822 have substantially equal power. The first beam 821 and the second beam 822 then travel to PMD system 808.

As stated in the background, PMD exists when optical pulses propagating down a fiber separate into two orthogonal modes of polarization that travel at different speeds. Thus, if PMD is affecting the input light beam, then there will be a $\Delta\tau$ between the first polarization mode of the first beam 821 and the second polarization mode of the second beam 822. PMD system 808 synchronizes the first polarization mode and the second polarization mode in time to compensate for PMD affecting the input light beam. To synchronize the first polarization mode and the second polarization mode in time means to eliminate or reduce the $\Delta\tau$ between the first polarization mode and the second polarization mode.

In PMD system 808, DOP measurement system 834 measures a degree-of-polarization (DOP) of an output light beam of light conditioning system 800 and generates control signals based on the DOP. DOP measurement system 834 transmits the control signals to delay 831 and delay 832 to control the amount that delay 831 delays the first polarization mode, the amount that delay 832 delays the second polarization mode, or both. By delaying one or both of the first polarization mode and the second polarization mode, delays 831–832 are able to synchronize the first polarization mode and the second polarization mode in time.

Liquid crystal module 810 then receives the first beam 821 and the second beam 822. Half wave plate 841 adjusts the first polarization mode of the first beam 821 to be parallel with the second polarization mode of the second beam 822. Wave plate 842 adjusts the polarization of the first beam 821 and the second beam 822 based on a control voltage from power monitor 844. Half wave plate 843 then adjusts the second polarization mode of the second beam 822 to again be orthogonal to the first polarization mode of the first beam 821.

Beam combiner 812 then receives the first beam 821 and the second beam 822. Beam combiner 812 combines the first beam 821 and the second beam 822 into an output light beam. Any PMD that was affecting the input light beam should be substantially compensated for in the output light beam. Combiner system 812 transmits the output light beam to a multiplexer.

Advantageously, light conditioning system 800, as an optical component, may be installed mid-link to compensate for PMD as opposed to being installed at the receiver end. The design of light conditioning system 800 takes advantage of the fact that network operators need to install DGE equipment mid-link in a long haul network to equalize gains over the channels. Light conditioning system 800 integrates PMD compensation with gain equalization. If light conditioning system 800 is installed mid-link to provide gain equalization, light conditioning system 800 also provides PMD compensation simultaneously.

Light conditioning system 800 is also a low insertion loss system that integrates gain equalization with PMD compensation. A traditional VOA as shown in FIG. 5 splits a light beam into a first beam having a first polarization mode and a second beam having a second polarization mode orthogonal to the first polarization mode. The design of light conditioning system 800 takes advantage of the configuration of a traditional VOA splitting the light beam into two orthogonal modes. When the light beam is split into the two orthogonal modes for the purpose of gain equalization, light conditioning system 800 synchronizes the two orthogonal modes to compensate for PMD. The PMD compensation from light conditioning system 800 does not further attenuate the beams.

What is claimed is:

1. A light conditioning system of a WDM optical communication network, the light conditioning system comprising:
    a splitter system that receives an input light beam representing a channel of the WDM optical communication network, and splits the input light beam into a first beam having a first polarization mode and a second beam having a second polarization mode substantially orthogonal to the first polarization mode;
    a polarization-mode dispersion (PMD) system that receives the first beam and the second beam, and synchronizes the first polarization mode of the first beam and the second polarization mode of the second beam in time to compensate for PMD affecting the input light beam; and
    a combiner system that receives the first beam and the second beam and combines the first beam and the second beam into an output light beam.

2. The light conditioning system of claim 1 wherein the light conditioning system is installed mid-link in the WDM optical communication network.

3. The light conditioning system of claim 2 wherein the splitter system receives the input light beam from a de-multiplexer installed mid-link in the WDM optical communication network.

4. The light conditioning system of claim 3 wherein the combiner system transmits the output light beam to a multiplexer installed mid-link in the WDM optical communication network.

5. The light conditioning system of claim 1 wherein the light conditioning system is installed mid-link at a gain equalization point in the WDM optical communication network.

6. The light conditioning system of claim 1 wherein the splitter system comprises a polarization beam splitter.

7. The light conditioning system of claim 1 wherein the PMD system comprises:
   a degree-of-polarization measurement system that measures a degree-of-polarization (DOP) of the output light beam and generates control signals based on the DOP;
   a first delay that receives the first beam and the control signals, and delays the first polarization mode of the first beam based on the control signals; and
   a second delay that receives the second beam and the control signals, and delays the second polarization mode of the second beam based on the control signals.

8. The light conditioning system of claim 1 wherein the combiner system comprises a polarization beam combiner.

9. The light conditioning system of claim 1 further comprising:
   a polarization system that receives the first beam and the second beam from the PMD system, adjusts the polarization of the first polarization mode and the second polarization mode so that the combiner system attenuates the output light beam a desired amount, and transmits the first beam and the second beam to the combiner system.

10. The light conditioning system of claim 9 wherein the splitter system, the PMD system, the polarization system, and the combiner system are integrated to provide PMD compensation and gain equalization simultaneously.

11. A method of compensating for polarization-mode dispersion (PMD) mid-link in a WDM optical communication network, the method comprising the steps of:
   splitting an input light beam representing a channel of the WDM optical communication network into a first beam having a first polarization mode and a second beam having a second polarization mode substantially orthogonal to the first polarization mode, wherein the input light beam is traveling mid-link in the WDM optical communication network;
   synchronizing the first polarization mode of the first beam and the second polarization mode of the second beam in time to compensate for PMD affecting the input light beam; and
   combining the first beam and the second beam into an output light beam.

12. The method of claim 11 further comprising the step of:
   receiving the input light beam from a de-multiplexer installed mid-link in the WDM optical communication network.

13. The method of claim 12 further comprising the step of:
   transmitting the output light beam to a multiplexer installed mid-link in the WDM optical communication network.

14. The method of claim 11 wherein the step of synchronizing the first polarization mode and the second polarization mode in time comprises:
   measuring a degree-of-polarization (DOP) of the output light beam;
   generating control signals based on the DOP; and
   delaying at least one of the first polarization mode and the second polarization mode based on the control signals.

15. The method of claim 11 further comprising the step of:
   adjusting the polarization of the first polarization mode and the second polarization mode so that the output light beam is attenuated a desired amount.

16. The method of claim 15 wherein the splitting step, the synchronizing step, the adjusting step, and the combining step provide PMD compensation and gain equalization simultaneously.

17. A light conditioning system of a WDM optical communication network, the light conditioning system comprising:
   a polarizing beam splitter that receives an input light beam representing a channel of the WDM optical communication network, and splits the input light beam into a first beam having a first polarization mode and a second beam having a second polarization mode substantially orthogonal to the first polarization mode;
   a polarization-mode dispersion (PMD) system that receives the first beam and the second beam from the polarizing beam splitter, and synchronizes the first polarization mode of the first beam and the second polarization mode of the second beam in time to compensate for PMD affecting the input light beam;
   a liquid crystal (LC) module that receives the first beam and the second beam, and changes the polarization of the first beam and the second beam based on an applied voltage; and
   a polarizing beam combiner that receives the first beam and the second beam from the liquid crystal module, and combines the first beam and the second beam into an output light beam.

18. The light conditioning system of claim 17 further comprising:
   a liquid crystal wave plate that receives the input light beam; and
   a power monitor that receives the first beam, generates a control voltage based on the first beam, and applies the control voltage to the liquid crystal wave plate to optimize the polarization of the input light beam so that the first beam and the second beam generated by the polarizing beam splitter having substantially equal power.

19. The light conditioning system of claim 17 wherein the PMD system comprises:
   a degree-of-polarization measurement system that measures a degree-of-polarization (DOP) of the output light beam and generates control signals based on the DOP;
   a first delay that receives the first beam and the control signals, and delays the first polarization mode of the first beam based on the control signals; and
   a second delay that receives the second beam and the control signals, and delays the second polarization mode of the second beam based on the control signals.

20. The light conditioning system of claim 17 wherein the liquid crystal module comprises:
   a first liquid crystal half wave plate that receives the first beam and adjusts the first polarization mode of the first beam to be substantially parallel with the second polarization mode of the second beam;

a liquid crystal wave plate that receives the first beam and the second beam, receives a control voltage from a power monitor, and adjusts the polarization of the first beam and the second beam based on the control voltage; and a second liquid crystal half wave plate that receives the second beam and adjusts the second polarization mode of the second beam to be substantially orthogonal to the first polarization mode of the first beam.

21. The light conditioning system of claim 17 wherein the light conditioning system is installed mid-link in the WDM optical communication network.

22. The light conditioning system of claim 17 wherein the light conditioning system is installed mid-link at a gain equalization point in the WDM optical communication network.

23. The light conditioning system of claim 17 wherein:
the polarizing beam combiner, the liquid crystal module, and the polarizing beam combiner provide gain equalization.

24. The light conditioning system of claim 21 wherein the polarizing beam splitter receives the input light beam from a de-multiplexer installed mid-link in the WDM optical communication network.

25. The light conditioning system of claim 24 wherein the polarizing beam combiner transmits the output light beam to a multiplexer installed mid-link in the WDM optical communication network.

26. The light conditioning system of claim 17 wherein the WDM optical communication network comprises one of a long haul and an ultra-long haul network.

27. The light conditioning system of claim 17 wherein:
the polarizing beam combiner, the PMD system, the liquid crystal module, and the polarizing beam combiner as integrated provide PMD compensation and gain equalization simultaneously.

* * * * *